(12) United States Patent
Lee

(10) Patent No.: US 7,990,441 B2
(45) Date of Patent: Aug. 2, 2011

(54) IMAGE SENSOR HAVING TEMPERATURE SENSOR AND DRIVING METHOD THEREOF

(75) Inventor: Jun-Taek Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 817 days.

(21) Appl. No.: 12/004,716

(22) Filed: Dec. 21, 2007

(65) Prior Publication Data

US 2008/0158378 A1 Jul. 3, 2008

(30) Foreign Application Priority Data

Jan. 3, 2007 (KR) .................. 10-2007-0000739

(51) Int. Cl.
 *H04N 9/64* (2006.01)
(52) U.S. Cl. ........................................ 348/244
(58) Field of Classification Search .............. 348/244, 348/241
See application file for complete search history.

(56) References Cited

U.S. PATENT DOCUMENTS

| 4,821,338 | A | * | 4/1989 | Naruse et al. | 356/227 |
| 5,416,516 | A | | 5/1995 | Kameyama et al. | |
| 6,271,880 | B1 | * | 8/2001 | Kameshima et al. | 348/244 |
| 6,630,955 | B2 | * | 10/2003 | Takada | 348/241 |
| 7,015,960 | B2 | * | 3/2006 | Tay | 348/244 |
| 7,256,378 | B2 | * | 8/2007 | Furukawa et al. | 250/208.1 |
| 7,692,707 | B2 | * | 4/2010 | Kondo et al. | 348/311 |
| 7,787,033 | B2 | * | 8/2010 | Rossi et al. | 348/244 |
| 2003/0057371 | A1 | * | 3/2003 | Wood | 250/330 |
| 2003/0107661 | A1 | * | 6/2003 | Pahr et al. | 348/244 |
| 2005/0083419 | A1 | * | 4/2005 | Honda et al. | 348/244 |
| 2005/0285954 | A1 | * | 12/2005 | Rossi et al. | 348/243 |
| 2006/0092287 | A1 | | 5/2006 | Hara et al. | |
| 2008/0106627 | A1 | * | 5/2008 | Ukai | 348/308 |

FOREIGN PATENT DOCUMENTS

| EP | 1781025 A1 | 5/2007 |
| JP | 7-336603 | 12/1995 |
| JP | 2001-88609 | 4/2001 |
| JP | 2001-230976 | 8/2001 |
| JP | 2001-257921 | 9/2001 |
| JP | 2004356866 | 12/2004 |
| JP | 2006-73887 | 3/2006 |
| KR | 199320968 | 10/1993 |
| KR | 2003-0068906 | 8/2003 |
| KR | 10-2006-0051412 | 5/2006 |
| WO | 2006009164 A1 | 1/2006 |

* cited by examiner

*Primary Examiner* — Jason Chan
*Assistant Examiner* — Gary C Vieaux
(74) *Attorney, Agent, or Firm* — Mills & Onello, LLP

(57) ABSTRACT

A method for driving an image sensor includes the steps of: sensing temperature from the image sensor; selecting a voltage level of a control signal in accordance with the sensed temperature; and detecting an image in response to the control signal having the selected voltage level. An image sensor comprises a temperature sensor configured to sense a temperature of the image sensor and a pixel array configured to detect an image in response to a control signal, wherein the control signal varies in voltage level as a function of the sensed temperature.

18 Claims, 9 Drawing Sheets

IMAGE SENSOR HAVING TEMPERATURE SENSOR AND DRIVING METHOD THEREOF

CROSS-REFERENCE TO RELATED APPLICATIONS

This U.S. non-provisional patent application claims priority under 35 U.S.C. §119 to Korean Patent Application No. 10-2007-00739 filed on Jan. 3, 2007, the entire contents of which are incorporated herein by reference.

BACKGROUND

The present invention disclosed herein relates to image sensors. More particularly, the present invention disclosed herein relates to an image sensor having a temperature sensor and a driving method thereof.

With the ever-growing evolution of digital technology, digital cameras are typical apparatuses in a variety of digital electronic products. Essential elements governing a quality of the digital camera are an optical lens and an image sensor. The image sensor operates to generate an electrical signal from light incident on the optical lens, representing a picture of good quality.

An image sensor generally has a pixel array, i.e., pluralities of pixels arranged in a matrix of two dimensions. Each pixel includes photosensitive means, and transmission and readout devices. According to types of the transmission and readout devices, the image sensors are generally classified into two kinds such as charge-coupled devices (CCD) and complementary metal-oxide-semiconductor image sensors (CIS). The CCD uses MOS capacitors for transferring and outputting signals, in which the MOS capacitors are adjacent to each other and charge carriers are stored in the MOS capacitor and conveyed to the adjacent capacitor by potential gaps. Different from that, the CIS operates in a switching mode by which MOS transistors detect outputs in sequence by the number of pixels.

The CCD is better than the CIS in noise and image quality, but has disadvantageous in product cost and power consumption over the CIS. In other words, the CIS has advantages of lower power, singularity of voltage and current source, small power consumption, compatibility to consolidate CMOS circuits, random access to image data, cost reduction by using standard CMOS technology, and so on. Accordingly, applications of the CIS are now expanding across digital cameras, smart phones, personal digital assistants (PDA), notebook computers, security cameras, barcode readers, high-definition televisions, resolution cameras, electronic playthings, and so forth.

Those image sensors are still required to increase distinction and reduce noise for the purpose of functioning like human eyes. Although image signal processors (ISP) have been recently added to improve the characteristic of noise susceptibility, they are still insufficient for confronting an increase of thermal noises inherent in the sensors itself.

SUMMARY OF THE INVENTION

Aspects of the present invention are directed to an image sensor configured for lessening deterioration due to thermal noises accompanying an increase in temperature, and a method for driving the image sensor.

In accordance with one aspect of the present invention, provided is a method for driving an image sensor, including the steps of: sensing temperature from the image sensor; selecting a voltage level of a control signal in accordance with the sensed temperature; and detecting an image in response to the control signal having the selected voltage level.

The temperature of the image sensor can be sensed by a temperature sensor.

The control signal can be operable in a plurality of voltage levels.

The image can be detected by a pixel drive circuit in response to the control signal. The pixel drive circuit can include: a temperature sensor operating to sense the temperature of the image sensor; and a row driver generating the control signal from one of the plural voltage levels in accordance with the sensed temperature and transferring the control signal to a pixel array.

The control signal can be operable in two voltage levels.

The control signal can be operable in a smaller one of the two voltage levels when the image is in low luminance and the image sensor is heated over predetermined temperature.

The temperature sensor can be disposed in the same structure with the pixel drive circuit.

In accordance with another aspect of the present invention, provided is an image sensor including: a temperature sensor configured to sense temperature from the image sensor; and a pixel array configured to detect an image in response to a control signal. The control signal can vary in voltage level as a function of the sensed temperature.

The pixel array can comprise a plurality of pixel drive circuits. Each pixel drive circuit can include: a photosensitive device configured to detect an image and to generate an image signal; and a transmission transistor configured to output the image signal in response to the control signal.

The image sensor can further include a row driver configured to select a voltage having one of plural voltage levels as the control signal, according to the sensed temperature, and to transfer the control signal of the selected voltage level to the pixel drive circuit.

The image sensor can further include a voltage generator configured to generate the plural voltage levels.

The image sensor can further include a row driver configured to generate the control signal having one of the plural voltage levels as the control signal, according to the sensed temperature, and to transfer the control signal to the pixel drive circuit.

The control signal can have one of two voltage levels.

The control signal can be operable in a smaller one of the two voltage levels when the image has a low luminance and the image sensor is heated over predetermined temperature.

The temperature sensor can be disposed in the same structure with the pixel drive circuit.

The temperature sensor can be disposed in the pixel array.

The temperature sensor can be comprised of active and passive devices.

All nodes associated with an output of the pixel array can be controlled by the sensed temperature.

The temperature sensor can be a plurality of temperature sensors.

The image sensor can be a complementary metal-oxide-semiconductor image sensor.

The image sensor can further include a level selection signal generator configured to generate a level selection signal as a function of the sensed temperature.

A voltage can be detected in correspondence with temperature and the level selection signal generator can be configured to generate the level selection signal by comparing the detected voltage with a set of reference voltages.

The row driver determines a voltage level of the control signal in response to the level selection signal. The image can further comprise a row driver configured to determine a voltage level of the control signal in response to the level selection signal.

The row driver can be configured to input plural control signals, each at a different voltage level, and to select one of the plural control signals as the control signal in response to the level selection signal.

In accordance with still another aspect of the present invention, provided is an image sensor including: a temperature sensor configured to sense a temperature from the image sensor; a pixel array configured to detect an image in response to a control signal; a row driver configured to control the pixel array to generate the control signal; and a power-up circuit configured to determine a voltage level of the control signal. A voltage level of the power-up circuit varies in accordance with the sensed temperature.

In accordance with another aspect of the present invention, provided is an image sensor comprising: a temperature sensor configured to sense a temperature of the image sensor; a pixel array configured to detect an image in response to a control signal and to generate an image signal; and an analog-to-digital converter configured to transform the image signal to a digital signal. A voltage level of the control signal varies in accordance with the sensed temperature.

In accordance with yet another aspect of the present invention, also provided is an image processing system including: an image sensor configured to output an image signal by sensing an image; and a temperature sensor configured to sense temperature from the image sensor. The image sensor is configured to control an output quantity of the image signal in accordance with the sensed temperature.

A further understanding of the nature and advantages of aspects of the present invention herein may be realized by reference to the remaining portions of the specification and the attached drawings.

BRIEF DESCRIPTION OF THE FIGURES

Non-limiting and non-exhaustive embodiments in accordance with the present invention will be described with reference to the following figures, wherein like reference numerals refer to like parts throughout the various figures unless otherwise specified. In the figures.

DETAILED DESCRIPTION OF PREFERRED EMBODIMENTS

Figure 1:
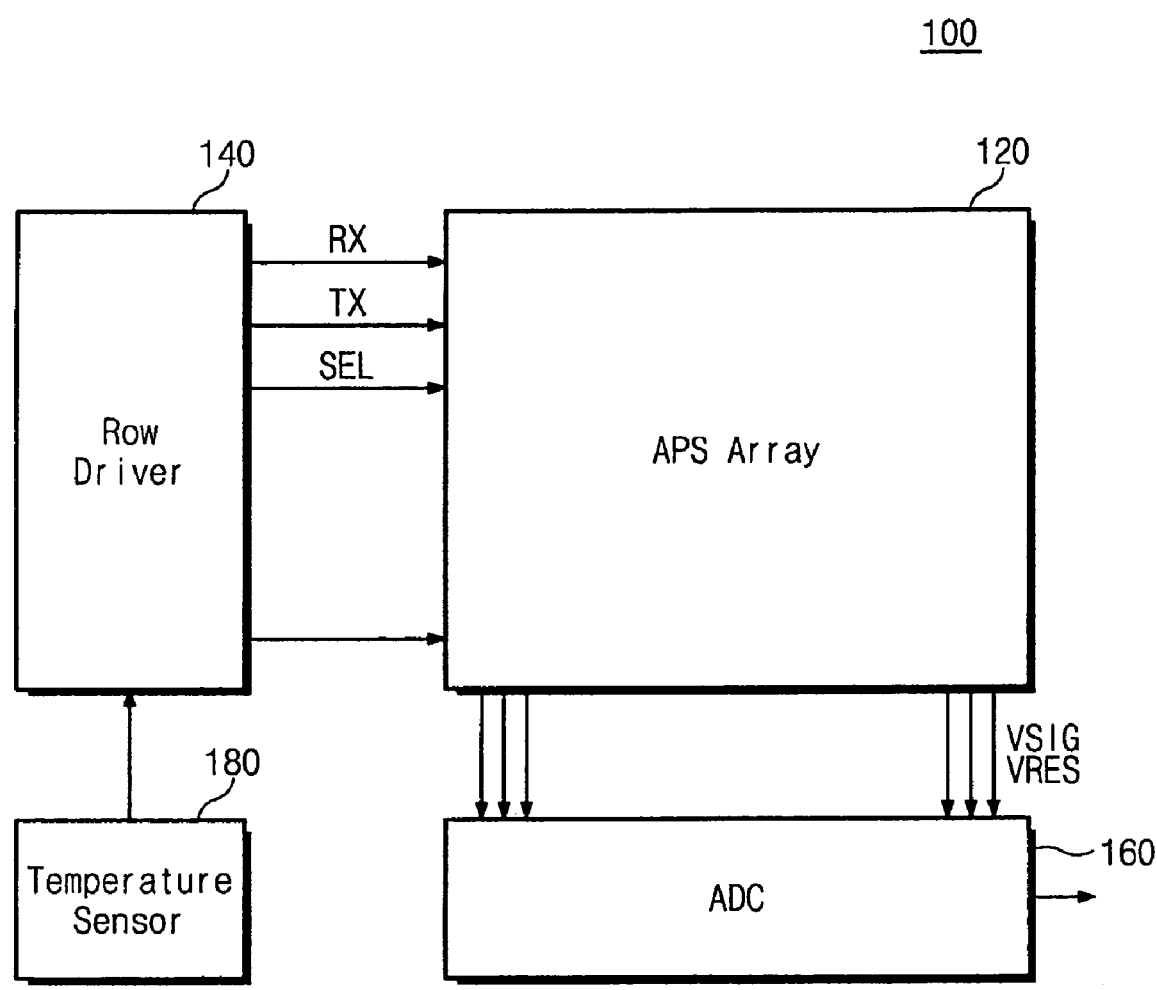
FIG. 1 is a block diagram of an embodiment of an image sensor according to the present invention.

Preferred embodiments in accordance with the present invention will be described below in more detail with reference to the accompanying drawings. The present invention can, however, be embodied in different forms and should not be constructed as limited to the embodiments set forth herein. Like reference numerals refer to like elements throughout the accompanying figures.

FIG. 1 is a block diagram of an embodiment of an image sensor 100 according to aspects of the present invention. Referring to FIG. 1, the image sensor 100 is comprised of a pixel array 120, a row driver 140, an analog-to-digital converter (ADC) 160, and a temperature sensor 180. The image sensor 100 is equipped with the temperature sensor 180, reducing an output value of the pixel array 120 when temperature is over a predetermined degree and light is illuminated in low level. Thereby, image quality of the image sensor 100 from deterioration due to thermal noises is substantially prevented. For convenience of description, the image sensor 100 will be described as being embodied in a type of CIS.

The pixel array 120 is formed of pluralities of pixels arranged in a matrix form. Each pixel includes a photodiode (i.e., a photosensitive device, not shown), and transistors (not shown) for transferring and outputting charges from the photodiode. The pixel can be configured in various forms in accordance with the number of transistors. A structure of the pixel array 120 according to aspects of the present invention will be detailed later in conjunction with FIG. 2.

The pixel array 120 is comprised of color filters for receiving light of specific colors on the tops of the pixels. The pixel array 120 has at least three kinds of color filters used to compose a color signal. The most general configuration of color filter array is the Bayer pattern (known in the art) that has repetitive arrangement of two rows; one row is of red (R) and green (G) color filters and the other row is of green (G) and blue (B) color filters. In this structure, G colors relative to luminance are disposed on all rows and R and B colors are arranged every other row in the array, which increases resolution of luminance. A digital still camera is generally equipped with a CIS that has more than a million pixels for the purpose of increasing the resolution.

The pixel array 120 generates an image signal by sensing light and converting the sensed light to an electrical signal by means of the photodiode. The image signal output from the pixel array 110 is the analog signal with three components of R, G, and B.

The row driver 140 generates a row selection signal SEL, a reset control signal RX, and a transmission control signal TX in response to timing control signals provided from a timing controller (not shown). The row selection signal SEL, the reset control signal RX, and the transmission control signal TX are transferred to the pixels of the pixel array 120. Here, the timing controller generates the timing control signals and addressing signals for selecting the pixels and outputting image signals sensed from the pixels.

The ADC 160 converts an analog image signal, which is output from the pixel array 120, into a digital signal. In converting an image signal VSIG of the photodiode into a digital signal through the photodiode, the correlated double sampling (CDS) mode is used in the image sensor. The ADC 160 operating in the CDS mode receives a reset signal VRES and converts the image signal VSIG, which is sensed from the photodiode, into a digital signal. Whenever new light is sensed by the photodiode in a predetermined period, the pixel array 120 outputs the reset signal VRES to the ADC 160 before applying the image signal VSIG, which is newly sensed by the photodiode, to the ADC 160. The ADC 160, after being reset in response to the reset signal VRES, generates a digital signal from the image signal VSIG input from the photodiode. Such a digital signal is transferred to a digital signal processor (not shown) and interpolated therein. Then, the digital signal processor drives a display unit, such as liquid crystal display (LCD), by generating drive signals proper for the resolution of the display unit.

The temperature sensor 180 operates to detect current temperature to be provided to the row driver 140. Depending on temperature, the signals RX, TX, and SEL output from the row driver 140 are varied. In further detail, if the image sensor 100 is warmed up over a predetermined degree of temperature, it drops voltage levels of the output signals RX, TX, and SEL. Thus, an output value of the pixel array 120 becomes lower. As a result, even with increasing thermal noise along a rise of temperature, the image sensor 100 controls the increased thermal noise not to affect its output. Therefore, the image sensor 100 is able to prevent deterioration of image quality due to thermal noise. The temperature sensor 180 will be discussed in more detail later with reference to FIG. 8.

According to aspects of the present invention, image sensor 100 is able to change voltage levels of the control signals RX, TX, and SEL in response to a current degree of temperature by means of the temperature sensor 180. Accordingly, in the environment with high temperature and low illuminance, the image sensor 100 acts to prevent deterioration of image quality.

Figure 2:
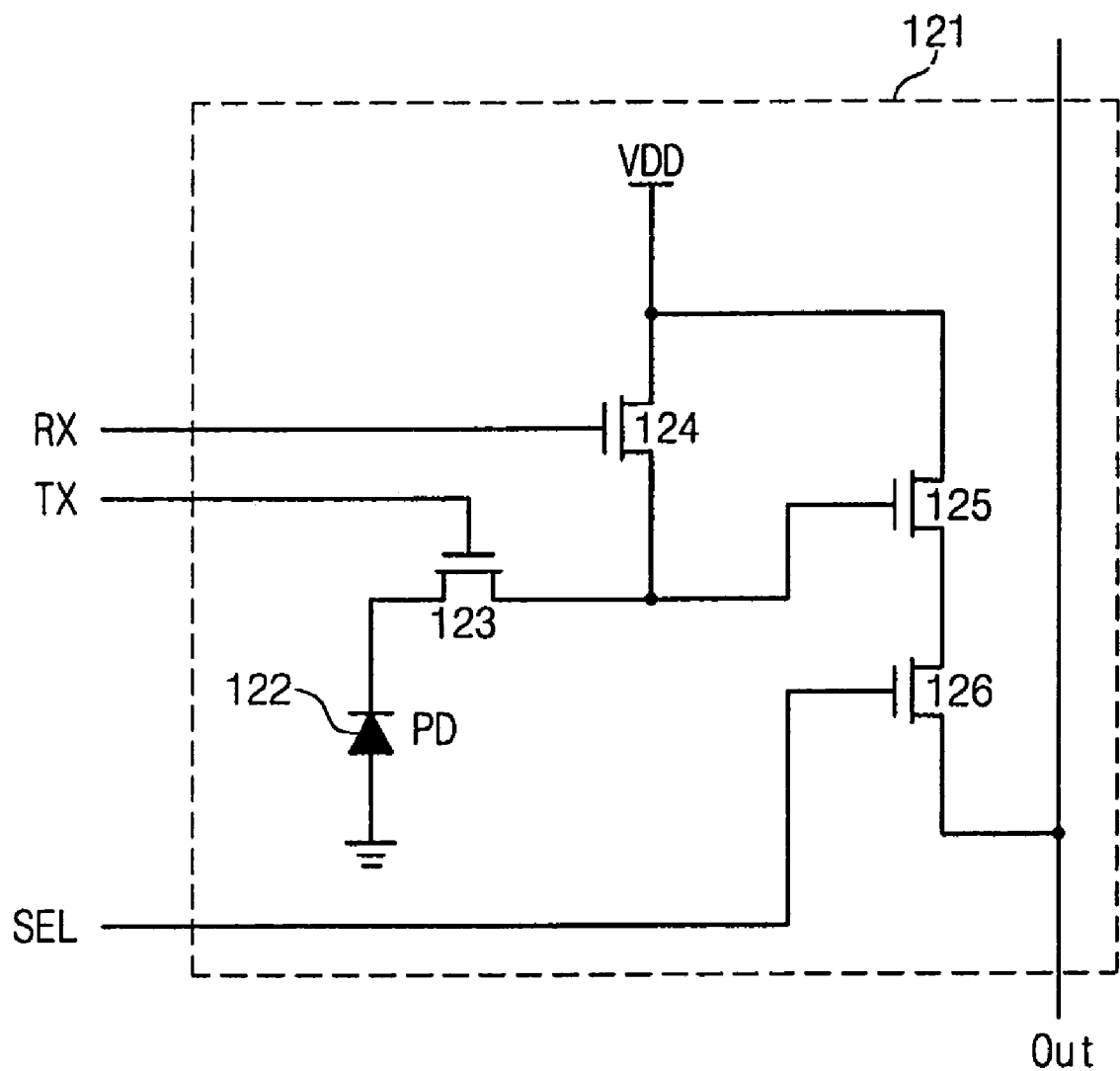
FIG. 2 is a circuit diagram of an embodiment of a unit pixel drive circuit in a pixel array according to the present invention.

FIG. 2 is a circuit diagram of an embodiment of a unit pixel drive circuit 121 that can be used in the pixel array 120, according to aspects of the present invention. Referring to FIG. 2, the pixel drive circuit 121 is comprised of the photodiode 122, a transmission transistor 123, a reset transistor 124, a sensing transistor 125, and a row selection transistor 126.

Figure 3:
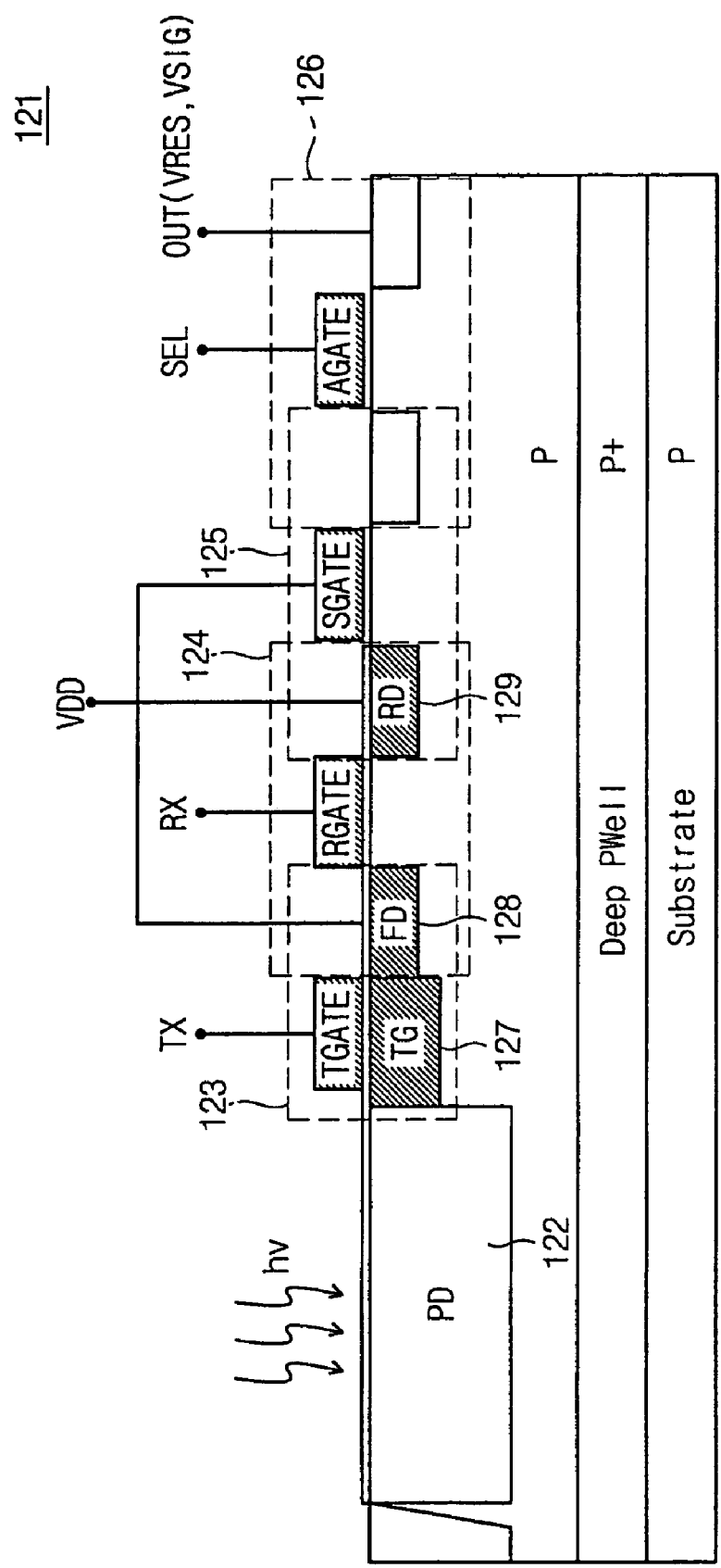
FIG. 3 is a sectional diagram of the pixel drive circuit shown in FIG. 2.

FIG. 3 is a sectional diagram showing a vertical structure of the pixel drive circuit 121 shown in FIG. 2. Referring to FIG. 3, the pixel drive circuit 121 is organized with including the photodiode 122 and four transistors 123~126.

When light "hv" is incident on photodiode 122, electron-hole pairs (EHPs) are generated in the photodiode 122. The mechanism of generating EHPs is as follows. Responding to incident light, electrons are excited toward the valence band from the conduction band in the photodiode 122. Those excited electrons cause EHPs to be induced in the photodiode 122. Electrons of the EHPs move along an electric field set thereat. Hereinafter, the electrons of EHPs will be referred to as 'EHP signal charges'.

The EHP signal charges are output to the ADC 160 in response to the control signals TX, RX, and SEL applied from the row driver 140.

The pixel drive circuit 121 operates as follows. In analog-to-digital conversion of the CDS mode, when the reset signal RX is activated at each pixel of a row designated by the row selection signal SEL, the reset transistor 124 is turned on. Then, a floating diffusion (FD) node 128 goes to a driving voltage VDD in potential. During this, the voltage of the FD node 128 is output as the reset signal VRES.

The EHP signal charges, which are generated from the photodiode 122 when there is incident light, changes a potential of a source node of the transmission transistor 123. If the transmission control signal TX is activated to turn the transmission transistor 123 on, the accumulated EHP signal charges are transferred to the FD node 128. Thereby, the FD node 128 varies in potential by the EHP signal charges, causing a gate SGATE of the sensing transistor 125 to vary in potential. During this, if the row selection transistor 126 is being turned on, a potential of a source node of the row selection transistor 126 is output as the image signal VSIG. After then, the reset transistor 124 is turned on to charge the FD node 128 up to the driving voltage VDD, which is applied to node RD 129. The pixel drive circuit 121 repeats this procedure. The ADC 160 conducts the operation of analog-to-digital conversion in accordance with a difference between the reset signal VRES and the image signal VSIG.

According to aspects of the present invention, the pixel drive circuit 121 functions to reduce a voltage level of the transmission control signal TX when current temperature of the image sensor 100 rises up over a predetermined degree. Thus, the pixel drive circuit 121 operates to prevent thermal noise from entirely propagating to the ADC 180. The reason for partially interrupting the thermal noise to the ADC 180 will be described in more detail with reference to FIGS. 4 through 7.

Figure 4:
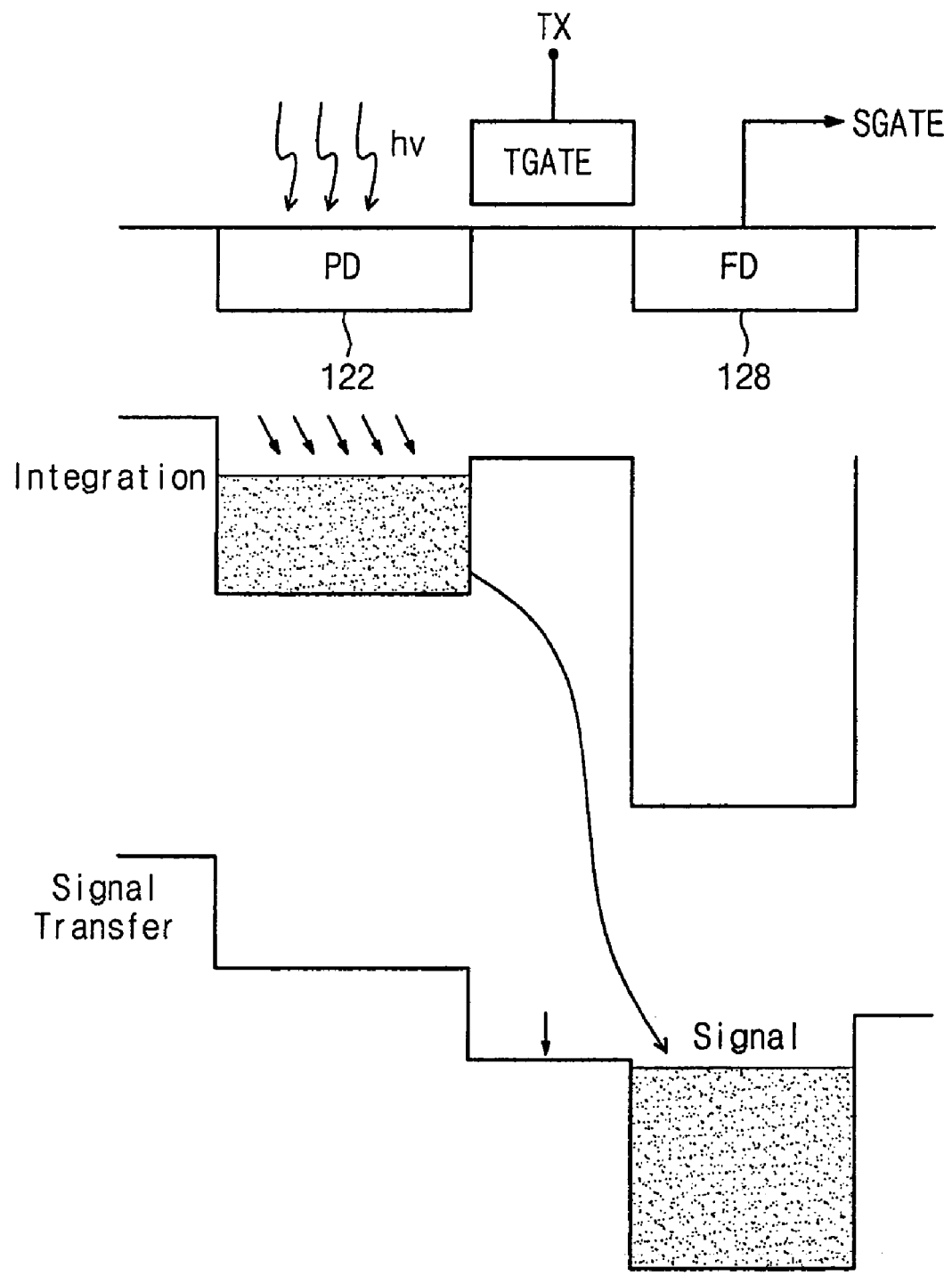
FIG. 4 illustrates an embodiment of a procedure of transferring an EHP charge signal from the pixel drive circuit according to the present invention.

FIG. 4 illustrates an embodiment of a procedure for transferring an EHP charge signal from the pixel drive circuit 121 according to aspects of the present invention. Referring to FIG. 4, when there is incident light, EHP signal charges are generated and accumulated in the photodiode 122. Responding to the transmission control signal TX applied to a gate TGATE of the transmission transistor 123, the generated EHP signal charges are transferred to the FD node 128. In other words, referring to FIGS. 2, 3, and 4, responding to the control signal TX applied to the transmission gate TGATE, the accumulated EHP signal charges flow into the FD node 128 if an energy level becomes lower. The signal charges flowing into the FD node 128 are transferred to the sensing gate SGATE. The signal transferred to the sensing gate SGATE is amplified by the sensing transistor 125 and output as the image signal through the row selection transistor 126.

The pixel drive circuit 121 changes a voltage level of the transmission control signal TX in response to temperature. For convenience of description, two cases will be discussed: one is when sensed temperature is over a predetermined degree; the other is when sensed temperature is under the predetermined degree. The transmission control signal TX can be divided into plural voltage levels, e.g., more than three, in order to improve the image quality.

The pixel drive circuit 121 is divisionally operable in a normal mode and a low luminance mode. These modes are distinguished in accordance with current temperature detected by the temperature sensor 180. In other words, the pixel drive circuit 121 operates in the normal mode under the predetermined degree of temperature, while operates in the low luminance mode over the predetermined degree of temperature.

Figure 5:
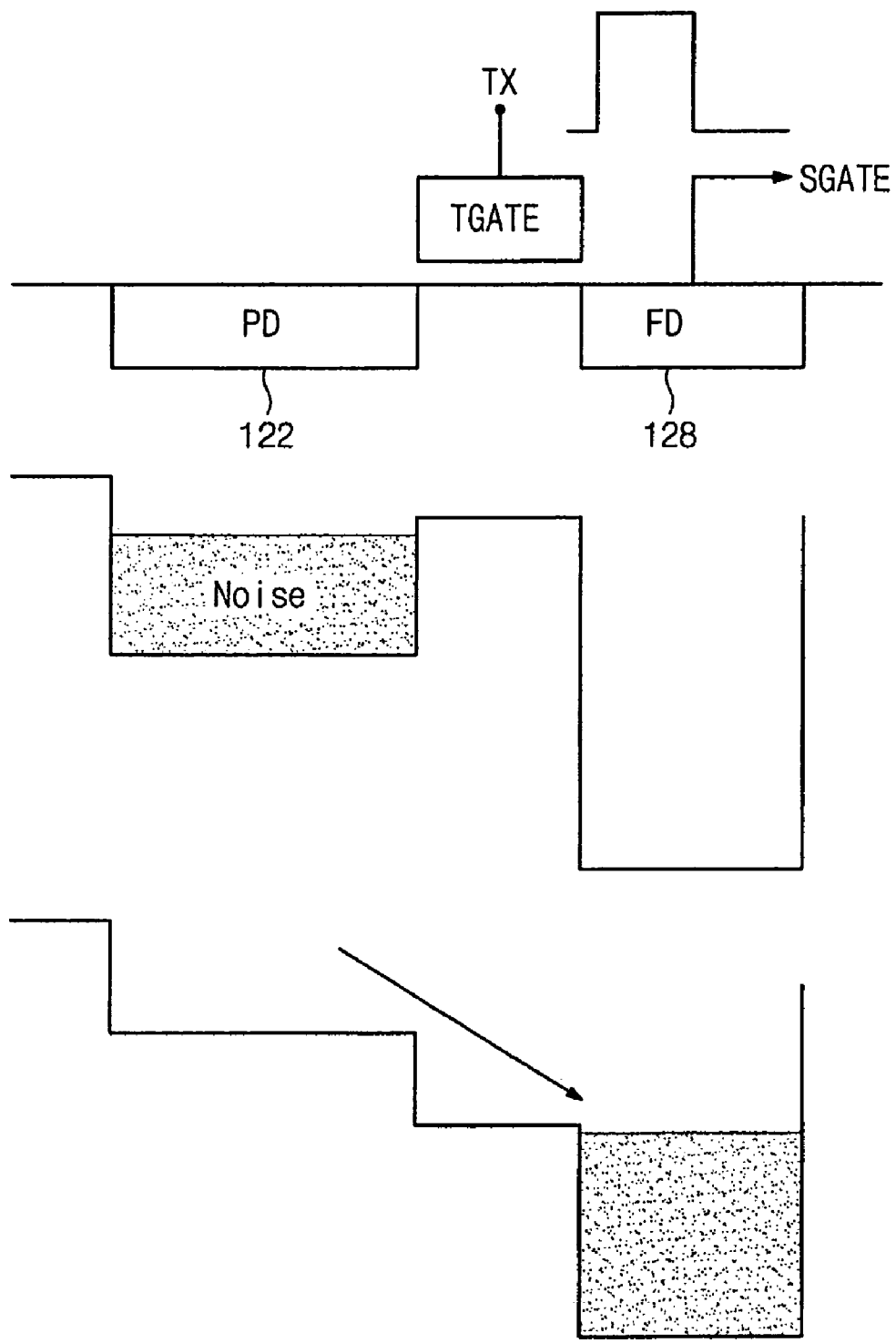
FIG. 5 illustrates an embodiment of a procedure of noise propagation in a normal operation mode of the pixel drive circuit according to the present invention.

FIG. 5 illustrates an embodiment of a procedure of noise propagation in a normal operation mode of the pixel drive circuit 121. Referring to FIG. 5, the photodiode 122 inevitably contains thermal noises, as well as EHP signal charges induced by incident light. In the normal mode, all of the noises flow into the FD node 128 from the photodiode 122. But since these noises are relatively small when compared to EHP signal charges in quantity, they do not significantly adversely affect an output level of the pixel drive circuit 121.

Figure 6:
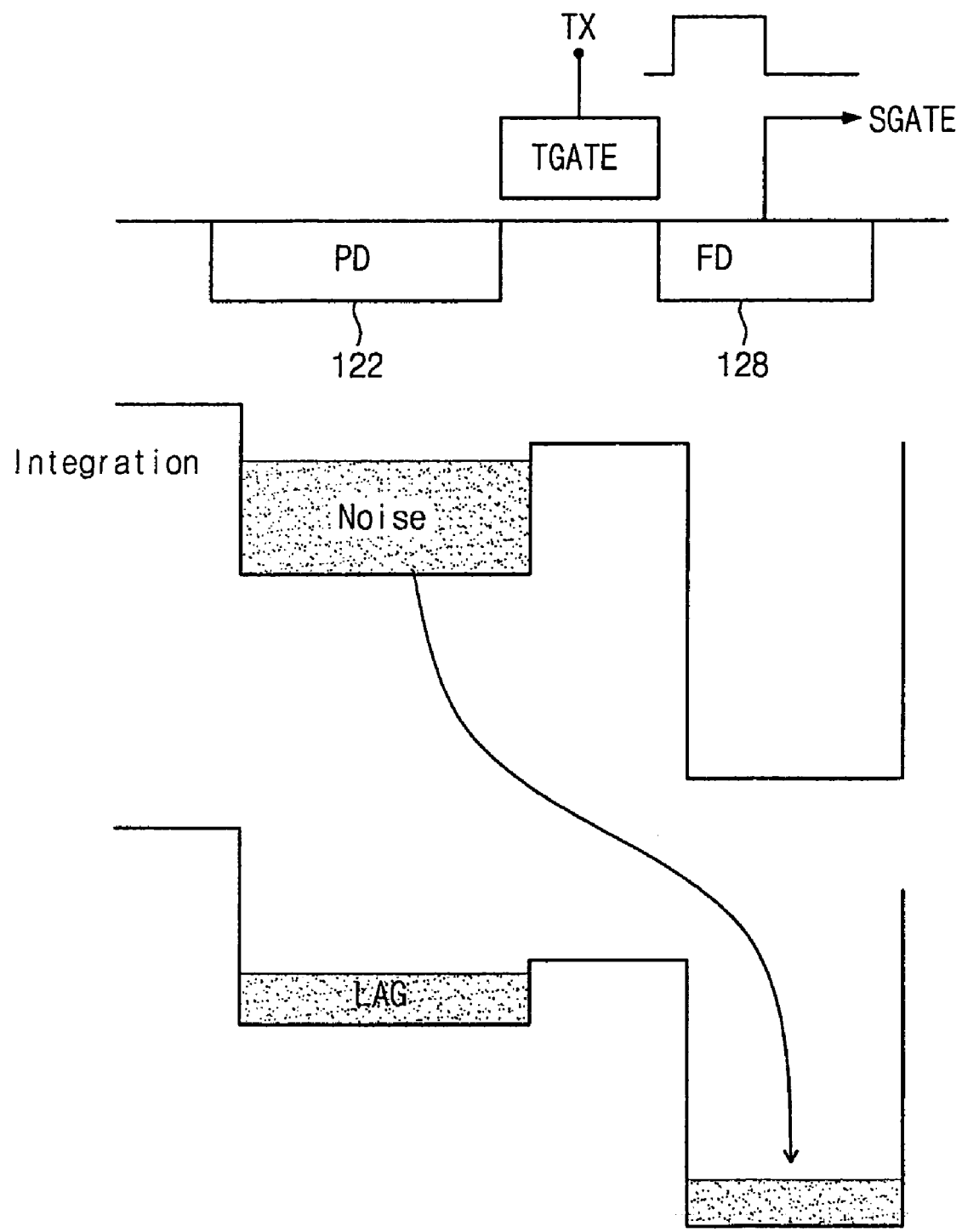
FIG. 6 illustrates an embodiment of a procedure of noise propagation in a low illuminance mode of the pixel drive circuit according to the present invention.

FIG. 6 illustrates an embodiment of a procedure of noise propagation in the low illuminance mode of the pixel drive circuit 121 according to aspects of the present invention. Referring to FIG. 6, when temperature is relatively high in the low luminance mode, an effect from noise becomes larger. During this condition, the temperature sensor 180 of the image sensor 100 detects current temperature and transfers the detected result to the row driver 140. The row driver 140 transfers the transmission control signal, which has a lower voltage level than that of the normal mode, in accordance with the sensed temperature. In response to the transmission control signal TX, the transmission transistor 123 transfers the EHP signal charges and noises to the FD node 128 from the photodiode 122. During this, the pixel drive circuit 121 does not transfer the noises to the FD node 128 from the photodiode 122. The noises partly remain in the photodiode 122. Thereby, the thermal noises are reduced relative to the EHP signal charges.

Therefore, the pixel drive circuit 121 provides the transmission control signal TX in different voltage levels according to temperature variation. In particular, when the image sensor 100 has a high temperature and light is incident thereon with low luminance, the control signal TX is lowered in voltage level to reduce a noise rate of the output image signal. As a result, the image sensor 100 according to aspects of the present invention is able to improve the noise characteristics influenced by temperature.

Figure 7A:
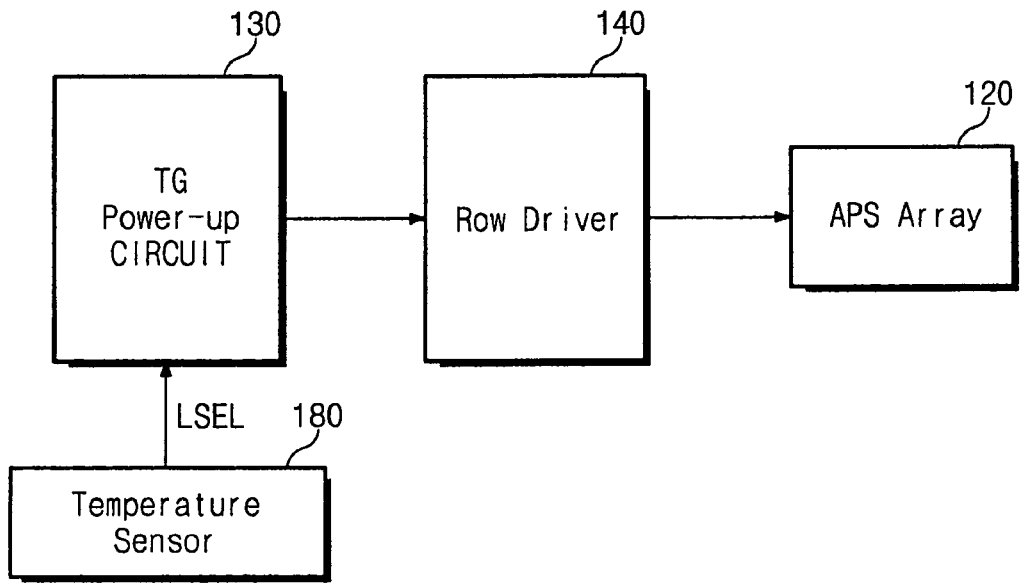
FIGS. 7A and 7B are block diagrams of an embodiment of the functional structure for controlling a temperature sensor according to the present invention.
Figure 7B:
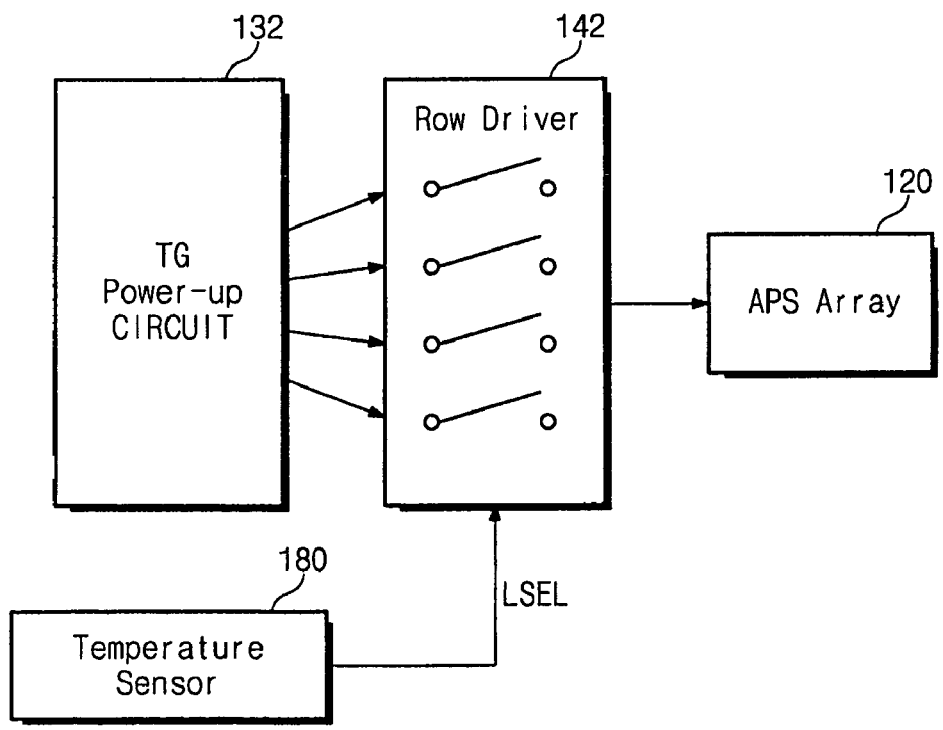

FIGS. 7A and 7B are block diagrams of an embodiment of a functional structure for controlling the temperature sensor 180 according to aspects the present invention.

Referring to FIG. 7A, the temperature sensor 180 is configured to control a transmission-gate (TG) power-up circuit 130. The temperature sensor 180 detects temperature of the image sensor 100 and then applies a level selection signal LSEL to the TG power-up circuit 130. The TG power-up circuit 130 selects and transfers a voltage level of the transmission control signal TX to the row driver 140 in response to the level selection signal LSEL. The row driver 140 generates the transmission control signal TX to control a selected one of the pixel drive circuit of the pixel (APS) array 120.

Referring to FIG. 7B, the temperature sensor 180 controls a row driver 142. For convenience of description, the transmission control signals TX are confined to being operable in four voltage levels. A TG power-up circuit 132 generates four kinds of the transmission control signals TX. The transmission control signals TX are applied to the row driver 132. The row driver 132 selects one of the four levels of the transmission control signals TX in response to the level selection signal LSEL provided from the temperature sensor 180. The row driver 132 controls the corresponding pixel drive circuit 121 of the pixel array 120 by the selected voltage level of the transmission control signal TX.

Although embodiments in accordance with the present invention include the configuration that the transmission control signal TX is available in four voltage levels, it may not be restricted to voltage levels of the transmission control signal. The voltage levels of the transmission control signal TX can be adjustable in value or number as a function of an operating condition.

Figure 8A:
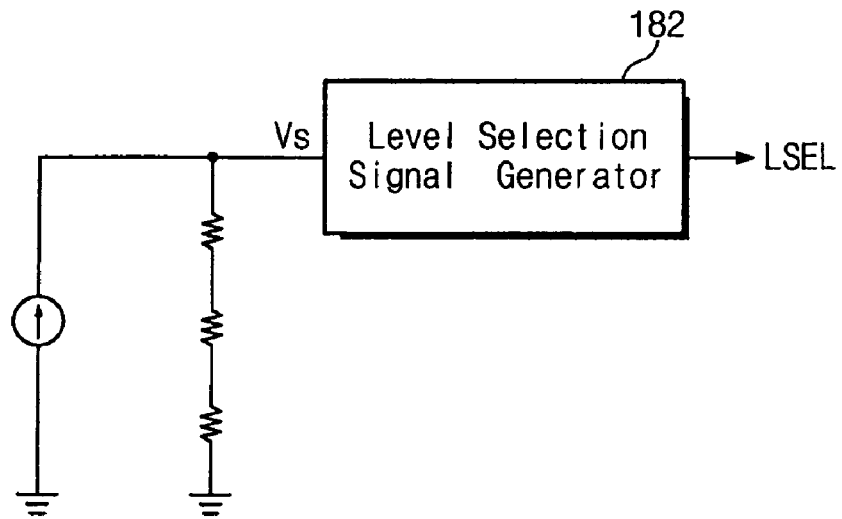
FIGS. 8A, 8B, and 8C illustrate embodiments of the temperature sensor according to the present invention.
Figure 8B:
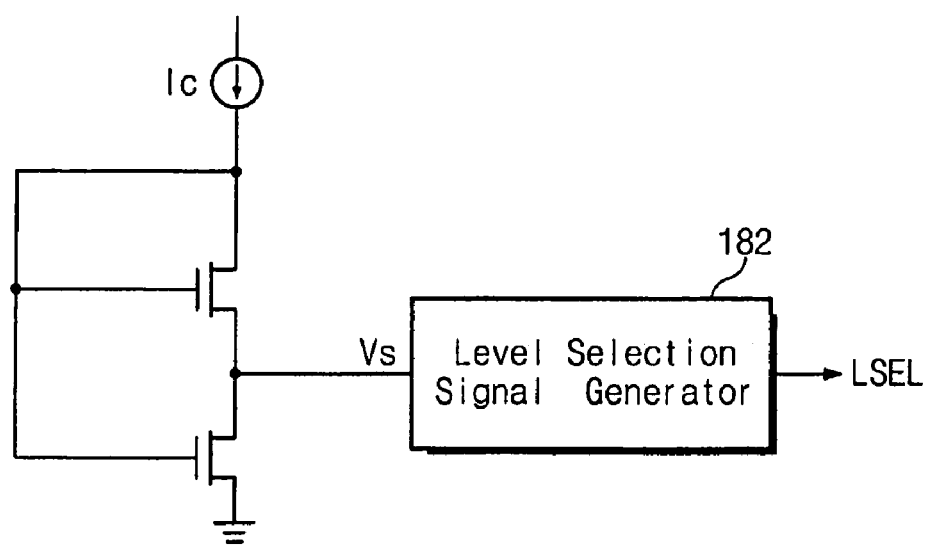
Figure 8C:
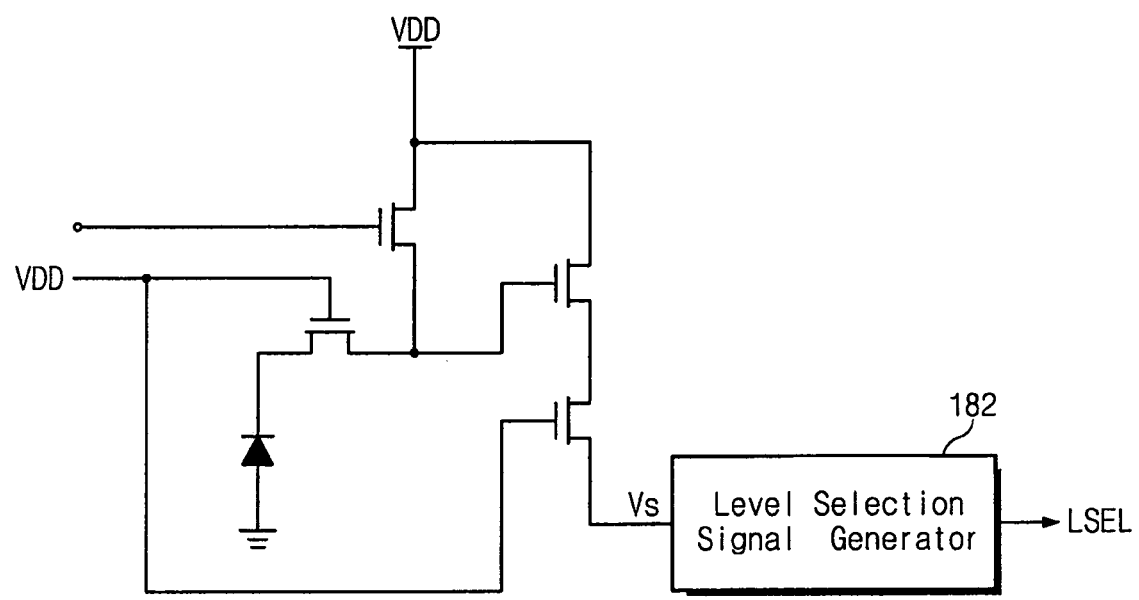

FIGS. 8A, 8B, and 8C illustrate embodiments of the temperature sensor 180 according to the present invention. The circuits shown in FIGS. 8A and 8B are organized by combination with active and passive devices. The circuit shown FIG. 8 is configured to have the same structure as the pixel array 120. Referring to FIGS. 8A, 8B, and 8C, the temperature sensor 180 detects an output voltage Vs according to temperature. The detected output voltage Vs is used to generate the level selection signal LSEL. Here, the level selection signal LSEL is generated from a level selection signal generator 182.

The level selection signal generator 182 stores reference voltages according to the temperature of the image sensor 100. Thus, the level selection signal generator 182 outputs the level selection signal LSEL by comparing the detected output voltage Vs with those reference voltages.

While the temperature sensor 180 of FIG. 8A, 8B, or 8C is embodied in single device, it may be prepared in plural devices.

The temperature sensor 180 is disposed at the contour of the pixel array 120, but it can be included in the pixel array 120. For instance, the temperature sensor 180 with the structure as shown in FIG. 8A, 8B, or 8C can be included in the pixel array 120.

In the meantime, the temperature sensor 180 is described as controlling only the transmission transistor 123, it may not be restricted hereto. The temperature sensor 100 according to the present invention can be configured as cooperating with all nodes associated with the output of the image sensor 100.

The temperature sensor 180 is disposed within the image sensor 100, but it may not be restricted hereto. In one embodiment, the temperature sensor can be disposed in another position of a system having an image sensor. In other words, the temperature sensor can be formed in a chip independent from the image sensor.

The image sensor 100 according to aspects of the present invention is able to change a voltage level of the transmission control signal TX by means of the temperature sensor 180. Thus, the image sensor 100 according to aspects of the present invention is capable of improving the deterioration characteristics against thermal noises in low luminance.

While the present invention is embodied such that a voltage level of the control signal is variable in accordance with temperature, it is also able to vary a level of power source voltage by temperature.

As described above, the image sensor according to the present invention is advantageous for lessening deterioration due to thermal noises in the condition of low illuminance by using a temperature sensor.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An image sensor comprising:
   a temperature sensor configured to sense a temperature of the image sensor, the temperature sensor including a level selection signal generator configured to generate a level selection signal as a function of the sensed temperature;
   a row driver configured to input plural control signals, each at a different voltage level, and to select one of the plural control signals as a control signal in response to the level selection signal; and
   a pixel array configured to detect an image in response to the control signal, wherein the control signal varies in voltage level as a function of the sensed temperature.

2. The image sensor as set forth in claim 1, wherein the pixel array comprises a plurality of pixel drive circuits, wherein each pixel drive circuit comprises:
   a photosensitive device configured to detect an image and to generate an image signal; and
   a transmission transistor configured to output the image signal in response to the control signal.

3. The image sensor as set forth in claim 2, wherein:
   the row driver is configured to select a voltage having one of plural voltage levels as the control signal, according to the sensed temperature, and to transfer the control signal having the selected voltage level to the pixel drive circuit.

4. The image sensor as set forth in claim 3, further comprising:

a voltage generator configured to generate voltages at the plural voltage levels.

5. The image sensor as set forth in claim 3, wherein:
the row driver is configured to generate the control signal having one of the plural voltage levels, according to the sensed temperature, and to transfer the control signal to the pixel drive circuit.

6. The image sensor as set forth in claim 5, wherein the control signal can have one of two voltage levels.

7. The image sensor as set forth in claim 6, wherein the control signal is operable in a smaller one of the two voltage levels when the image has a low luminance and the image sensor is heated over predetermined temperature.

8. The image sensor as set forth in claim 1, wherein the temperature sensor is disposed in the same structure with the pixel drive circuit.

9. The image sensor as set forth in claim 8, wherein the temperature sensor is disposed in the pixel array.

10. The image sensor as set forth in claim 8, wherein the temperature sensor is comprised of active and passive devices.

11. The image sensor as set forth in claim 1, wherein the temperature sensor is a plurality of temperature sensors.

12. The image sensor as set forth in claim 1, which is a complementary metal-oxide-semiconductor image sensor.

13. The image sensor as set forth in claim 1, wherein a voltage is detected in correspondence with temperature and the level selection signal generator is configured to generate the level selection signal by comparing the detected voltage with a set of reference voltages.

14. The image sensor as set forth in claim 1, wherein the pixel array comprises a pixel drive circuit configured to output an image signal having a voltage level that varies as a function of the sensed temperature, the pixel drive circuit comprising:
a transmission transistor configured to receive a control signal TX;
a photodiode coupled between a source of the transmission transistor and ground;
a reset transistor coupled between a source voltage and a drain of the transmission transistor, and configured to receive a control signal RX; and
a row selection transistor coupled between the source voltage and the output, and configured to receive a row selection signal SEL.

15. An image sensor comprising:
a temperature sensor configured to sense a temperature of the image sensor, the temperature sensor including a level selection signal generator configured to generate a level selection signal as a function of the sensed temperature;
a pixel array configured to detect an image in response to a control signal;
a row driver configured to control the pixel array to generate the control signal, wherein the row driver is configured to input plural control signals, each at a different voltage level, and to select one of the plural control signals as the control signal in response to the level selection signal; and
a power-up circuit configured to determine a voltage level of the control signal,
wherein a voltage level of the power-up circuit varies in accordance with the sensed temperature.

16. The image sensor as set forth in claim 15, wherein the pixel array comprises a pixel drive circuit configured to output an image signal having a voltage level that varies as a function of the sensed temperature, the pixel drive circuit comprising:
a transmission transistor configured to receive a control signal TX;
a photodiode coupled between a source of the transmission transistor and ground;
a reset transistor coupled between a source voltage and a drain of the transmission transistor, and configured to receive a control signal RX; and
a row selection transistor coupled between the source voltage and the output, and configured to receive a row selection signal SEL.

17. An image processing system comprising:
an image sensor configured to output an image signal by sensing an image;
a temperature sensor configured to sense temperature of the image sensor, the temperature sensor including a level selection signal generator configured to generate a level selection signal as a function of the sensed temperature; and
a row driver configured to input plural control signals, each at a different voltage level, and to select one of the plural control signals as the control signal in response to the level selection signal,
wherein the image sensor controls an output quantity of the image signal in accordance with the sensed temperature.

18. The image processing system as set forth in claim 17, wherein the image sensor comprises a pixel drive circuit configured to output an image signal having a voltage level that varies as a function of the sensed temperature, the pixel drive circuit comprising:
a transmission transistor configured to receive a control signal TX;
a photodiode coupled between a source of the transmission transistor and ground;
a reset transistor coupled between a source voltage and a drain of the transmission transistor, and configured to receive a control signal RX; and
a row selection transistor coupled between the source voltage and the output, and configured to receive a row selection signal SEL.

* * * * *